United States Patent [19]

Obata et al.

[11] Patent Number: 5,478,866
[45] Date of Patent: Dec. 26, 1995

[54] FLEXIBLE POLYURETHANE FOAM AND PROCESS FOR PREPARING SAME

[75] Inventors: Masashi Obata; Seijiro Sakai; Kaoru Ueno, all of Kanagawa, Japan

[73] Assignee: Mitsui Toatsu Chemicals, Inc., Tokyo, Japan

[21] Appl. No.: 426,009

[22] Filed: Apr. 20, 1995

[30] Foreign Application Priority Data

Apr. 27, 1994 [JP] Japan .................................. 6-089333
Apr. 27, 1994 [JP] Japan .................................. 6-089334

[51] Int. Cl.$^6$ .......................... C08G 18/02; C08G 18/06
[52] U.S. Cl. ............................................ 521/160; 521/130
[58] Field of Search ...................................... 521/130, 160

[56] References Cited

U.S. PATENT DOCUMENTS 5,389,693  2/1995  DeGenova et al. ...................... 521/51
5,416,125  5/1995  Limen et al. ............................ 521/160

*Primary Examiner*—Morton Foelak
*Attorney, Agent, or Firm*—Burns, Doane, Swecker & Mathis

[57] ABSTRACT

A flexible polyurethane foam which has a low density, enhanced impact resilience, improved compression set and excellent effect on the reduction of 6 Hz vibration transmissibility and is obtained by a reaction of an organic polyisocyanate composition, that is, a mixture of (a) polymethylenepolyphenyl isocyanate containing from more than 60 to 90% by weight of a two benzene ring compound and having a weight ratio [three benzene ring compound]/[four or more benzene ring compounds + less active ingredient] of 1.1–20.0, and (b) tolylene diisocyanate in a ratio (a)/(b) of $97 \approx 80/3 \approx 20$ by weight, or by reaction of a prepolymer derived from said organic polyisocyanate composition and a specific polyol, with a resin premix comprising a water blowing agent and an active hydrogen containing compound; and a process for preparing the flexible polyurethane foam.

12 Claims, No Drawings

FLEXIBLE POLYURETHANE FOAM AND PROCESS FOR PREPARING SAME

BACKGROUND OF THE INVENTION

1. Field of the Invention

The present invention relates to a flexible polyurethane foam and a process for preparing the same. More particularly, the invention relates to a water blown flexible polyurethane foam which is broadly used for automotive cushion interiors, head rests and furniture cushions, and a process for preparing the flexible foam.

2. Description of the Related Art

Conventionally, flexible polyurethane foams have been prepared by the reaction of an organic polyisocyanate composition with a resin premix obtained by mixing active hydrogen containing compounds such as polyoxyalkylene polyols with blowing agents, catalysts, surfactants and other auxiliary agents.

The organic polyisocyanate composition which has been used consists of tolylene diisocyanate or a mixture of 95~50% by weight of tolylene diisocyanate and the remainder of polymethylenepolyphenyl isocyanate (Japanese-Laid Open Patent SHO 62-112011). Such a TDI-high resilience system (hereinafter referred to simply as TDI-HR system) which means a formulation obtained by using tolylene diisocyanate as a primary ingredient and a foam derived from the formulation, is excellent in high impact resilience of 60~70% and light weight. On the other hand. TDI has high vapor pressure and is liable to cause problems on working environment. TDI has also disadvantages of generating a larger amount of flash from the face of the mold in the mold filling and forming step and requiring a relatively long time for demolding.

In order to overcome these disadvantages, techniques have been proposed to use polymethylenepolyphenyl isocyanate in place of tolylene diisocyanate.

For example, Japanese Laid-Open Patent SHO 58-458 has disclosed a process for using a polyisocyanate composition consisting of 60~90 % by weight of 4,4'-diphenylmethane diisocyanate, 3~30 % by weight of 2,4'-diphenylmethane diisocyanate and the remainder of polymethylenepolyphenyl isocyanate having three or more benzene rings. Japanese Patent Publication SHO 63-38369 has described a process for using a urethane modified polyisocyanate composition having an NCO content of 15~30 % which is obtained by reacting a mixture consisting of 55~85 % by weight of diphenylmethane diisocyanate and the remainder of polymethylenepolyphenyl isocyanate having three or more benzene rings with a polyol having a functionality of 2~4 and a molecular weight of 60~1500.

Tile MDI-high resilience system (hereinafter referred to simply as MDI-HR system) obtained by using polymethylenepolyphenyl isocyanate as a primary ingredient is excellent in view of improved working environment, enhanced demolding ability and reduction of mold flash. The impact resilience is an index of riding comfort required for car cushions and it has been a serious problem that the MDI-HR system has a low impact resilience of 55~65% as compared with the TDI-HR system. It is also quite unfavorable that the MDI-HR system has a high vibrational characteristic value of 0.8 or more in tile transmissibility of 6 Hz vibration. Further, the above MDI-HR system used chlorofluorocarbons as auxiliary blowing agents. However, these agents cannot be used now because of the regulation in order to prevent a hostile environment due to destruction of the ozone layer. Accordingly, in the case of preparing a flexible polyurethane foam with the MDI-HR system using water as a blowing agent, the amount of water increases and a great amount of urea linkage generates.

As a result, the resulting flexible foam is inferior in physical properties such as durability (compression set) and riding comfort (impact resilience and transmissibility of 6 Hz vibration) as compared to the foam prepared by using chlorofluorocarbons as auxiliary blowing agents in combination with water. Thus, it has also been difficult to reduce tile density of the foam. Flexible polyurethane foams used for car cushions in particular are strongly required to reduce the transmissibility of the foam for 6 Hz vibration. This is because human internal organs are said to resonate to the 6 Hz vibration and thus the high transmissibility of 6 Hz vibration leads to resonance of the internal organs which provides unpleasant feeling in the course of driving the car.

In order to overcome these disadvantages, for example, Japanese Patent Publication HEI 06-021148 has disclosed a process for using a polyisocyanate composition comprising 10~30% by weight of compounds having three or more benzene rings in polymethylenepolyphenyl isocyanate and 1~10 parts by weight of tolylene diisocyanate. Japanese Laid-Open Patent HEI 04-185626 has described a process for using a polyisocyanate composition comprising 1~20% by weight of an isocyanate terminated prepolymer derived from tolylene diisocyanate and polyester polyol, 10~70% by weight of diphenylmethane diisocyanate and 89~10% by weight of polymethylenepolyphenyl isocyanate having three or more benzene rings.

These processes, however, have been difficult to provide a flexible polyurethane foam having an impact resilience of 60 % or more, desirably 70% or more and a 6 Hz transmissibility of 0.8 or less, desirably 0.6 or less.

SUMMARY OF THE INVENTION

One object of the invention is, in the preparation of a flexible polyurethane foam by using water as a blowing agent, to provide the flexible polyurethane foam having a low density, that is, an overall density of 55 kg/m$^3$ or less, enhanced impact resilience, improved compression set and a very excellent effect for reducing the transmissibility of 6 Hz vibration.

Another object of the invention is, in the preparation of a flexible polyurethane foam by using water as a blowing agent, to provide a process for preparing the flexible polyurethane foam having a low density, that is, an overall density of 55 kg/m$^3$ or less, enhanced impact resilience, improved compression set used a very excellent effect for reducing the transmissibility of 6 Hz vibration.

As a result of an intensive investigation in order to overcome the above disadvantages, the present inventors have found that these objects can be accomplished by controlling the benzene ring composition of polymethylenepolyphenyl isocyanate, and have thus completed the invention.

That is, the aspect of the invention is a flexible polyurethane foam obtained by the reaction of an organic polyisocyanate composition with a mixture of an active hydrogen containing compound, blowing agent, catalyst, surfactant and other auxiliary agent, and a process for preparing the flexible polyurethane foam, comprising using water as a blowing agent and using a mixture of:

(a) polymethylenepolyphenyl isocyanate represented by the formula (1):

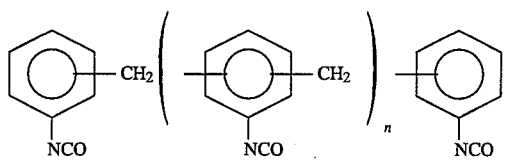

wherein n is 0 or an integer of 1 and more, content of a two benzene ring compound (n=0) is from more than 60% to 90% or less by weight, and a weight ratio of a three benzene ring compound (n=1) to the sum of a four or more benzene ring compound (n>2) and a less active ingredient is 1.1~20.0, and (b) 2,4- and/or 2,8- tolylene diisocyanate, in a ratio (a)/(b) of 97~80/3~20 by weight as the organic polyisocyanate composition; and a preparation process of the flexible polyurethane foam.

Another aspect of the invention is a flexible polyurethane foam and a process for preparing the flexible polyurethane foam, comprising using as the organic polyisocyanate composition an isocyanate terminated prepolymer obtained by reacting the above organic polyisocyanate composition with a single compound or a mixture of polyoxyalkylene polyol having an ethylene oxide proportion of 85 mol % or less in alkylene oxide, and average functionality of 2~4, and an average molecular weight of 2000~10,000.

The present invention can prepare, even by using water as a blowing agent, a flexible polyurethane foam which has a low density, that is, an overall density of 5.5 kg/m³ or less, excellent compression set, impact resilience of 60% or more, transmissibility for 6 Hz vibration of 60% or more and is excellent in durability and riding comfort.

DETAILED DESCRIPTION OF PREFERRED EMBODIMENTS

In the present invention, tolylene diisocyanate is simply referred to as TDI, diphenylmethane diisocyanate as MDI, 4,4'-diphenylmethane diisocyanate as 4,4'-MDI, 2,4'-diphenylmethane diisocyanate as 2,4'-MDI and polymethylenepolyphenyl isocyanate as poly-MDI, respectively.

Poly-MDI comprises polymethylenepolyphenyl isocyanate represented by the below formula (1) and other less active ingredients, for example, carbodiimide and uretonimine compounds, isocyanate dimers such as uretidion, isocyanate trimers such as isocyanurate and tarry substances of unspecified structure.

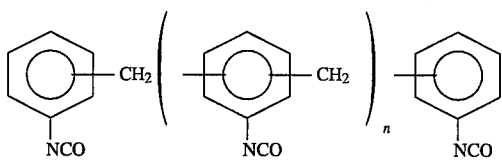

wherein n is 0 or an integer of 1 and more.

Polybenzene ring isocyanate consists of the two benzene ring compound (n=0), three benzene ring compound (n=1) and four or more benzene ring compounds (n>2). Content of these compounds is decreased with increase in the number of the benzene ring and substances up to an about six benzene ring compound are substantially contained.

Consequently, the amount of the four or more benzene ring compounds and the less active ingredients in tile invention corresponds to the sum of the other compounds than the two benzene ring compound and the three benzene ring compound.

Poly-MDI (a) in the organic polyisocyanate composition of the invention comprises the two benzene ring compound in an amount of from more than 60% to 90% or less by weight, preferably from more than 60% to 80% or less by weight and the weight ratio of the three benzene ring compound to the sum of the four or more benzene ring compounds and the less active ingredients, that is, the ratio [three benzene ring compound]/[four or more benzene ring compound + less active ingredient] by weight, is 1.1~20.0, preferably 1.2~10.0, more preferably 2.0~ 4.0.

Exemplary marketed poly-MDI is COSMONATE M-200 (Trade Mark of Mitsui Toatsu Chemicals Inc.). This poly-MDI has a weight ratio [three benzene ring compound]/[four or more benzene ring compound+less active ingredient] of 0.3~0.9, and is hence unsuitable for poly-MDI component used in the invention. The poly-MDI for use in the invention can be obtained by the process described, for example, in Japanese Laid-Open Patent HEI 05-310676.

In the quantitative analysis on the benzene ring composition of poly-MDI, the isocyanate group of poly-MDI is previously deactivated by converting, for example, to methyl carbonate and then subjected to a liquid chromatography using tetrahydrofuran or dimethylformamide as a solvent.

2,4-TDI and/or 2,6-TDI (b) in the organic polyisocyanate composition of the invention has no particular restriction upon the isomer ratio. Exemplary isomer ratio 2,4-TDI/2,6-TDI includes 100/0, 80/20 and 65/35 by weight.

The organic polyisocyanate composition which can be used in the invention comprises the above (a) and (b). The ratio (a)/(b) is 97~ 80/3~20 by weight, preferable 95~85/ 5~15 by weight.

The isocyanate terminated prepolymer which can be obtained by reacting the above organic polyisocyanate composition with a specific active hydrogen containing compound can also be used as an organic polyisocyanate composition of the invention. The above specific active hydrogen containing compound which can be used is a single compound or a mixture of polyoxyalkylene polyol having an ethylene oxide proportion in the range of 85 mol % or less in alkylene oxide, an initiator functionality of 2~4 and an average molecular weight of 2,000~10,000, preferably having an ethylene oxide proportion in the range of 50~80 mol %, an initiator functionality of 2~4 and an average molecular weight of 3,000~8,000.

The polyoxyalkylene polyol which can be used for the above prepolymer (hereinafter referred to as modification polyol) can be obtained by using initiators of 2~4 functionality, for example, polyhydroxy compounds such as ethylene glycol, glycerol, pentaerythritol and triethylene glycol or alkanolamine such as triethanolamine, and by adding to these initiators one or more kinds alkylene oxides such as propylene oxide and ethylene oxide by a known process. The polyoxyalkylene polyol has an ethylene oxide proportion of 85% by mol or less in alkylene oxide and a weight average molecular weight of 2,000~ 10,000. The amount of the modification polyol is usually 30 parts by weight or less for 100 parts by weight of the organic polyisocyanate composition.

On the reaction of the above organic polyisocyanate composition to prepare the flexible polyurethane foam, the active hydrogen containing compounds and the auxiliary agents are used in the form of a resin premix.

The active hydrogen containing compounds which can be used as an ingredient of the premix are polyols such as polyoxyalkylene polyol and polyester polyol.

Exemplary polyoxyalkylene polyols can be obtained by using as the initiator polyhydroxy compounds such as glycerol, pentaerythritol, sorbitol and triethylene glycol or alkanolamines such as triethanolamine and by adding to these initiators one or more kinds of alkylene oxide such as propylene oxide and ethylene oxide by a known process. Particularly preferred polyoxyalkylene polyol has an ethylene oxide proportion of 5% or more and an average molecular weight of 4,000~ 10,000.

Polyester polyol used in the invention can be obtained by reacting a compound such as ethylene glycol which has two and more hydroxyl groups or a mixture of such polyols with a compound such as malonic acid which has two and more carboxyl groups or a mixture of such acids.

Polymer polyols obtained by conducting radical polymerization of an ethylenically unsaturated compounds on the above polyoxyalkylene polyol can also be preferably used.

Water is used as a blowing agent. Water can be used singly or in combination with other blowing agents such as carbon dioxide, nitrogen, and hydrocarbons. However, simultaneous use of chlorofluorocarbons is undesired in view of global environmental protection from ozone layer destruction.

It is quite surprising that the organic polyisocyanate composition obtained in the invention by mixing poly-MDI of a specific benzene ring composition with TDI in a specific proportion can provide, in the complete absence of chlorofluorocarbons, a flexible polyurethane foam which has an overall foam density of 55 kg/m$^3$ or less, high impact resilience, low compression set and low transmissibility for 6 Hz vibration and is excellent in durability and riding comfort.

Catalysts which can be used are triethylenediamine, dimethylethanolamine bis(dimethylamino)ethyl ether and other conventionally known catalysts.

Silicone surfactant, for example, SRX-274C (Trade Mark of Toray-Dow Corning Co.) and L-5309 (Trade Mark of Nippon Unicar Co.) can be used.

Other auxiliary agents refer to crosslinking agents, flame retardants, viscosity reducing agents, colorants and stabilizers. Exemplary crosslinking agents include triethanolamine and diethanolamine. As to the flame retardants, viscosity reducing agents, colorants and stabilizers, conventionally known agents can be used for the invention.

EXAMPLE

The present invention will hereinafter be illustrated by way of examples.

In these examples, part and % mean part by weight and % by weight, respectively.

(1) Preparation of the organic polyisocyanate composition TDI which was used in the below preparation process had a 2,4-/2,6-isomer ratio of 80/20 in any example.

A) To 85.0 parts of poly-MDI which contained 67.5% by weight of the two benzene ring compound, 24.0% by weight of the three benzene ring compound and 8.6% by weight of the sum of the four or more benzene ring compounds and the less active ingredients, 15.0 parts of TDI was added and stirred for an four. To the resulting mixture, 14.5 parts of polyether polyol which had an average molecular weight of 3,000 and an initiator functionality of 2 and was obtained by random addition polymerization of ethylene oxide and propylene oxide in a molar ratio of 80/20 was added reacted at 80° C. for 2 hours with stirring. The organic polyisocyanate composition (A) thus obtained had an NCO content of 29.7% and was used for the forming test.

B) To 90.0 parts of poly-MDI which contained 72.9% by weight of the two benzene ring compound, 25.7% by weight of the three benzene ring compound and 1.4% by weight of the sum of the four or more benzene ring compounds and the less active ingredients, 10.0 parts of TDI was added and stirred for an hour. To the resulting mixture, 18.5 parts of polyether polyol which had an average molecular weight of 7,500 and an initiator functionality of 3 and was obtained by random addition polymerization of ethylene oxide and propylene oxide in a molar ratio of 50/50 was added and reacted at 80° C. for 2 hours with stirring. The organic polyisocyanate composition (B) thus obtained had an NCO content of 29.0% and was used for the forming test.

C) To 95.0 parts of poly-MDI which contained 85.0% by weight of the two benzene ring compound, 11.3% by weight of the three benzene ring compound and 3.7% by weight of the sum of the four or more benzene ring compounds and the less active ingredients, 5.0 parts of TDI was added and stirred for an hour. To the resulting mixture, 20.0 parts of polyether polyol which had an average molecular weight of 10,000 and an initiator functionality of 4 and was obtained by random addition polymerization of ethylene oxide and propylene oxide in a molar ratio of 43/57 was added and reacted at 80° C. for 2 hours with stirring. The organic polyisocyanate composition (C) thus obtained had an NCO content of 27.0% and was used for the foaming test.

D) To 95.0 parts of poly-MDI which contained 71.1% by weight of the two benzene ring compound, 16.3% by weight of the three benzene ring compound and 12.6% by weight of the sum of the four or more benzene ring compounds and the less active ingredients, 17.0 parts of TDI was added and stirred for an hour. To the resulting mixture, 21.0 parts of polyether polyol which had an average molecular weight of 7,000 and an initiator functionality of 2 and was obtained by random addition polymerization of ethylene oxide and propylene oxide in a molar ratio of 85/15 was added and reacted at 80° C. for 2 hours with stirring. The organic polyisocyanate composition (D) thus obtained had an NCO content of 29.2% and was used for the foaming test.

E) To 85.0 parts of poly-MDI which contained 72.3% by weight of the two benzene ring compound, 20.2% by weight of the three benzene ring compound and 7.5% by weight of the sum of the four or more benzene ring compounds and the less active ingredients, 15.0 parts of TDI was added and stirred for an hour. The organic polyisocyanate composition (E) thus obtained had an NCO content of 34.8% and was used for the foaming test.

F) To 93.0 parts of poly-MDI which contained 80.1% by weight of the two benzene ring compound, 17.4% by weight of the three benzene ring compound and 2.5% by weight of the sum of the four or more benzene ring compound and the less active ingredients, 7.0 parts of TDI was added and stirred for an hour. The organic polyisocyanate composition (F) thus obtained had an NCO content of 34.4% and was used for the foaming test.

G) To 90.0 parts of poly-MDI which contained 72.9% by weight of the two benzene ring compound. 25.7% by weight of the three benzene ring compound and 1.4% by weight of the sum of the four or more benzene ring compounds and the less active ingredients, 10.0 parts of TDI was added and stirred for an hour. To the resulting mixture, 18.5 parts of polyether polyol which had an average molecular weight of 5,000 and an initiator functionality of 3 and was obtained by random addition polymerization of ethylene oxide and propylene oxide in a molar ratio of 0/100 was added and reacted at 80° for 2 hours with stirring. The organic polyisocyanate composition (G) thus obtained had an NCO content of 28.9% and was used for tile foaming test.

H) To 88.0 parts of poly-MDI which contained 70.0% by weight of the two benzene ring compound, 27.9% by weight of the three benzene ring compound and 2.1% by weight of the sum of the four or more benzene ring compounds and the less active ingredients, 12.0 parts of TDI was added and stirred for an hour. The organic polyisocyanate composition (H) thus obtained had an NCO content of 34.8% and was used for the foaming test.

I) To 83.0 parts of poly-MDI which contained 94.4% by weight of the two benzene ring compound, 5.2% by weight of the three benzene ring compound and 0.3% by weight of the sum of the four or more benzene ring compounds and the less active ingredients, 17.0 parts of TDI was added and stirred for an hour. The organic polyisocyanate composition (I) thus obtained had an NCO content of 35.9% and was used for the foaming test.

J) To 93.0 parts of poly-MDI which contained 58.5% by weight of the two benzene ring compound, 36.9% by weight of the three benzene ring compound and 4.6% by weight of the sum of the four or more benzene ring compounds and the less active ingredients, 7.0 parts of TDI was added and stirred for an hour. The organic polyisocyanate composition (J) thus obtained had an NCO content of 34.0% and was used for the foaming test.

K) To 100.0 parts of poly-MDI which contained 71.1% by weight of the two benzene ring compound, 21.9% by weight of the three benzene ring compound and 7.3% by weight of the sum of the four or more benzene ring compounds and the less active ingredients, 13.5 parts of polyether polyol which had an average molecular weight of 5,000 and an initiator functionality of 3 and was obtained by random addition polymerization of ethylene oxide and propylene oxide in a molar ratio of 0/100 was added and reacted at 80° C. for 2 hours with stirring. The organic polyisocyanate composition (K) thus obtained had an NCO content of 29.0% and was used for the foaming test.

polyether polyol which had an average molecular weight of 3,000 and an initiator functionality of 3 and was obtained by random polymerization of ethylene oxide and propylene oxide in a molar ratio of 90/10 was added and reacted at 80° C. for 2 hours with stirring. The organic polyisocyanate composition (L) thus obtained had an NCO content of 28.7% and was used for the foaming test.

M) To 75.0 parts of poly-MDI which contained 70.0% by weight of the two benzene ring compound, 17.5% by weight of the three benzene ring compound and 12.5% by weight of the sum of the four or more benzene ring compound and the less active ingredients, 25.0 parts of TDI was added and stirred for an hour. The organic polyisocyanate composition (M) thus obtained had an NCO content of 36.5% and was used for the foaming test.

N) To 90.0 parts of poly-MDI which contained 78.9% by weight of the two benzene ring compound, 20.3% by weight of the three benzene ring compound and 0.8% by weight of the sum of the four or more benzene ring compounds and the less active ingredients, 10.0 parts of TDI was added and stirred for an hour. The organic polyisocyanate composition (N) thus obtained had an NCO content of 34.7% and was used for the foaming test.

O) To 90.0 parts of poly-MDI which contained 69.8% by weight of the two benzene ring compound, 12.5% by weight of the three benzene ring compound and 17.8% by weight of the sum of the four or more benzene ring compounds and the less active ingredients, 10.0 parts of TDI was added and stirred for an hour. To the resulting mixture, 19.1 parts of polyether polyol which had an average molecular weight of 5,000 and an initiator functionality of 3 and was obtained by random polymerization of ethylene oxide and propylene oxide in a molar ratio of 0/100 was added and reacted at 80° C. for 2 hours with stirring. The organic polyisocyanate composition (O) thus obtained had an NCO content of 28.8 and was used for the foaming test.

Table 1 and 2 illustrate raw materials and their amounts used for the organic polyisocyanate composition in the examples and comparative examples.

TABLE 1

| Organic polyisocyanate composition | A | B | C | D | E | F | G | H |
|---|---|---|---|---|---|---|---|---|
| Poly-MDI (part) | 85.0 | 90.0 | 95.0 | 83.0 | 85.0 | 93.0 | 90.0 | 88.0 |
| Composition (wt %) | | | | | | | | |
| Two benzene ring compound | 67.5 | 72.9 | 85.0 | 71.1 | 72.3 | 80.1 | 72.9 | 70.0 |
| 4,4'-Isomer | 67.5 | 66.1 | 68.0 | 64.1 | 63.6 | 64.1 | 66.1 | 60.0 |
| 2,4'-Isomer | 0.0 | 6.8 | 17.0 | 7.0 | 8.7 | 16.0 | 6.8 | 10.0 |
| Three benzene ring compound | 24.0 | 25.7 | 11.3 | 16.3 | 20.2 | 17.4 | 25.7 | 27.9 |
| Four or more benzene ring compounds + less active ingredients | 8.6 | 1.4 | 3.7 | 12.6 | 7.5 | 2.5 | 1.4 | 2.1 |
| [Three benzene ring compound]/ [Four or more benzene ring compounds + less active ingredients] | 2.8 | 19.0 | 3.1 | 1.3 | 2.7 | 7.0 | 19.0 | 13.3 |
| TDI (part) | 15.0 | 10.0 | 5.0 | 17.0 | 15.0 | 7.0 | 10.0 | 12.0 |
| Modification polyol (part) | 14.5 | 18.5 | 20.0 | 21.0 | — | — | 18.5 | — |
| Ethylene oxide content (%) | 80 | 50 | 43 | 85 | — | — | 0 | — |
| Initiator functionality | 2 | 3 | 4 | 2 | — | — | 3 | — |
| Molecular weight | 3000 | 7500 | 10000 | 7000 | — | — | 5000 | — |
| NCO content (%) | 29.7 | 29.0 | 27.0 | 29.2 | 34.8 | 34.4 | 28.9 | 34.8 |

L) To 83.0 parts of poly-MDI which contained 71.1% by weight of the two benzene ring compound, 16.3% by weight of the three benzene ring compound and 12.6% by weight of the sum of the four or more benzene ring compounds and the less active ingredients, 17.0 parts of TDI was added and stirred for an hour. To the resulting mixture, 21.0 parts of

TABLE 2

| Organic polyisocyanate composition | I | J | K | L | M | N | O |
|---|---|---|---|---|---|---|---|
| Poly-MDI (part) | 83.0 | 93.0 | 100.0 | 83.0 | 75.0 | 90.0 | 90.0 |
| Composition (wt %) | | | | | | | |
| Two benzene ring compound | 94.4 | 58.5 | 71.1 | 71.1 | 70.0 | 78.9 | 69.8 |
| 4,4'-Isomer | 65.2 | 49.7 | 46.9 | 64.1 | 70.0 | 63.1 | 57.7 |
| 2,4'-Isomer | 29.3 | 8.8 | 24.2 | 7.0 | 0.0 | 15.8 | 12.1 |
| Three benzene ring compound | 5.2 | 36.9 | 21.9 | 16.3 | 17.5 | 20.3 | 12.5 |
| Four or more benzene ring compounds + less active ingredients | 0.3 | 4.6 | 7.3 | 12.6 | 12.5 | 0.8 | 17.8 |
| [Three benzene ring compound]/ [Four or more benzene ring compounds + less active ingredients] | 17.0 | 8.0 | 3.0 | 1.3 | 1.4 | 25.0 | 0.7 |
| TDI (part) | 17.0 | 7.0 | 0.0 | 17.0 | 25.0 | 10.0 | 10.0 |
| Modification polyol (part) | — | — | 13.5 | 21.0 | — | — | 19.1 |
| Ethylene oxide content (%) | — | — | 0 | 90 | — | — | 0 |
| Initiator functionality | — | — | 3 | 3 | — | — | 3 |
| Molecular weight | — | — | 5000 | 3000 | — | — | 5000 |
| NCO content (%) | 35.9 | 34.0 | 29.0 | 28.7 | 36.5 | 34.7 | 28.8 |

(2) Preparation of the resin premix

The resin premix used for reacting with the above organic polyisocyanate composition was prepared according to the following proportion.

| | (unit: part by weight) |
|---|---|
| Polyether polyol | 100.0 |
| Initiator functionality = 3, | |
| Ethylene oxide proportion = 15 wt % | |
| Average molecular weight = 6,000 | |
| Silicone surfactant, SRX-274C | 1.0 |
| (Trade Mark of Toray-Dow Corning Co.) | |
| Amine catalyst, Minico L-1020 | 0.4 |
| (Trade Mark of Katsuzai Chem. Co.) | |
| Amine catalyst, Minico-TMDA | 0.15 |
| (Trade Mark of Katsuzai Chem. Co.) | |
| Water (blowing agent) | 3.6 |

EXAMPLES 1~8

The organic polyisocyanate compositions (A)~(H) which were prepared in the above (1) were individually mixed with the resin premix prepared in (2) so as to obtain an NCO index (NCO/OH) of 100 and poured into the below described mold under following conditions.

Mold: Aluminum test mold having dimensions of 400× 400×100 mm

Mold temperature :55±2° C.

Demolding time: 4 minutes (Time from pouring to mold release)

Properties of the foam obtained were measured by the following methods

Overall density (kg/m$^3$): In accordance with JIS K-6401

25% ILD hardness (kg/314 cm$^2$): In accordance with JIS K-6401

Impact resilience (%): In accordance with JIS K-6401

50% compression set (%)

Dry heat: In accordance with JIS K-6301

Wet heat: In accordance with JIS K-6301

6 Hz vibration transmissibility:

Measured under 50 kg load and an amplitude of 5 mm with a vibration tester, model C-1002 DL (Trade Mark of Ito Seiki Co.)

Results are illustrated in Table 3.

The foams obtained in Examples 1~8 illustrate high impact resilience, good compression set and low 6 Hz vibration transmissibility even in the overall density of 55 kg/m$^3$ or less.

COMPARATIVE EXAMPLES 1~7

The organic polyisocyanate compositions (I) to (O) which were prepared in the above (1) were individually mixed with the resin premix prepared in (2) so as to obtain as isocyanate index of 100. Molded foams were prepared by the same procedures as described in Example 1 and foam properties were measured.

Results are illustrated in Table 4.

The organic polyisocyanate compositions used in Comparative Examples 1~7 have compositions outside the scope of the invention. That is, Comparative Example 1 had a too high content of the two benzene ring compound in polymethylenepolyphenyl isocyanate.

Comparative Example 2 had a too low content of the two benzene ring compound. Comparative Example 3 did not use tolylene diisocyanate. Comparative Example 4 had a too high ethylene oxide content in the modification polyol and this led to unstable behavior in foaming, generated collapse of foam, and could not provide a normally molded foam.

Comparative Example 5 had a too much amount of tolylene diisocyanate.

In Comparative Example 6, the ratio [three benzene ring compound]/[four or more benzene ring compounds+less active ingredients] was too high.

In Comparative Example 7. the ratio [three benzene ring compound]/[four or more benzene ring compound+less active ingredients] was too low.

Consequently, in the case of using the organic polyisocyanate composition outside the scope of the invention or modified with an unsuitable polyol, foam properties such as impact resilience, compression set and 6 Hz vibration transmissibility became inferior.

However, these examples are not intended to limit the scope of the present invention. The present invention may be practiced or embodied in still other ways without departing from the spirit or essential character thereof.

TABLE 3

| | Example | | | | | | | |
|---|---|---|---|---|---|---|---|---|
| | 1 | 2 | 3 | 4 | 5 | 6 | 7 | 8 |
| Organic polyisocyanate composition | A | B | C | D | E | F | G | H |
| NCO-Index (NCO/OH) × 100 | 100 | 100 | 100 | 100 | 100 | 100 | 100 | 100 |
| Foam property | | | | | | | | |
| Overall density (kg/m$^3$) | 48.0 | 49.1 | 45.3 | 48.9 | 50.1 | 49.9 | 49.8 | 44.3 |
| 25% ILD (kg/314 cm$^2$) | 19.9 | 18.3 | 22.1 | 18.5 | 22.0 | 21.1 | 20.1 | 18.9 |
| Impact resilience (%) | 74 | 70 | 75 | 73 | 62 | 65 | 64 | 65 |
| 50% Compression set | | | | | | | | |
| Dry heat (%) | 1.9 | 1.3 | 1.3 | 2.1 | 2.3 | 3.3 | 3.2 | 1.9 |
| Wet heat (%) | 2.5 | 2.1 | 4.3 | 2.8 | 5.0 | 5.2 | 4.3 | 4.0 |
| 6 Hz vibration transmissibility | 0.55 | 0.59 | 0.55 | 0.50 | 0.65 | 0.60 | 0.75 | 0.60 |

TABLE 4

| | Comparative Example | | | | | | |
|---|---|---|---|---|---|---|---|
| | 1 | 2 | 3 | 4 | 5 | 6 | 7 |
| Organic polyisocyanate composition | I | J | K | L | M | N | O |
| NCO-Index (NCO/OH) × 100 | 100 | 100 | 100 | 100 | 100 | 100 | 100 |
| Foam property | | | | | | | |
| Overall density (kg/m$^3$) | 51.0 | 50.0 | 51.0 | collapse | 51.2 | 50.3 | 50.8 |
| 25% ILD (kg/314 cm$^2$) | 21.9 | 16.7 | 25.0 | | 17.5 | 18.4 | 19.9 |
| Impact resilience (%) | 55 | 59 | 55 | | 58 | 58 | 56 |
| 50% Compression set | | | | | | | |
| Dry heat (%) | 8.1 | 5.0 | 8.0 | | 6.3 | 5.9 | 5.6 |
| Wet heat (%) | 12.3 | 8.2 | 10.6 | | 15.0 | 10.0 | 13.6 |
| 6 Hz vibration transmissibility | 1.00 | 0.98 | 1.10 | | 1.30 | 1.09 | 0.88 |

What is claimed is:

1. A flexible polyurethane foam obtained by the reaction of an organic polyisocyanate composition with a mixture of an active hydrogen containing compound, blowing agent, catalyst, surfactant and other auxiliary agent comprising using water as a blowing agent and using a mixture of:

(a) polymethylenepolyphenyl isocyanate represented by the formula (1):

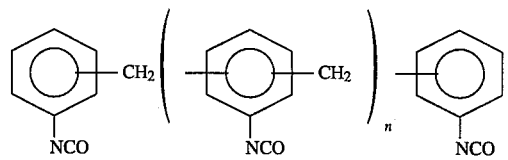

(1)

wherein n is 0 or an integer of 1 and more, content of a two benzene ring compound (n=0) is from more than 60% by weight to 90% by weight, and the weight ratio of the three benzene ring compound (n=1) to the sum of the four or more benzene ring compound (n≧2) and the less active ingredient; [three benzene ring compound]/[four or more benzene ring compound + less active ingredient] is 1.1~20.0, and (b) tolylene diisocyanate, in a ratio (a)/(b) of 97~80/3~20 by weight as the organic polyisocyanate composition.

2. A flexible polyurethane foam according to claim 1 wherein the content of the two benzene ring compound is from more than 60% by weight to 80% by weight and the ratio [three benzene ring compound]/[four or more benzene ring compound+less active ingredient] is 1.2~10.0.

3. A flexible polyurethane foam according to claim 1 wherein the ratio (a)/(b) is 95~85/5~15 by weight.

4. A flexible polyurethane foam comprising using as an organic polyisocyanate composition an isocyanate terminated prepolymer obtained by reacting the organic polyisocyanate composition of claim 1 with a single compound or a mixture of polyoxyalkylene polyol having an initiator functionality of 2~4, an ethylene oxide proportion of 0~85 mol % in alkylene oxide and an average molecular weight of 2,000~10,000.

5. A flexible polyurethane foam according to claim 4 wherein the proportion of ethylene oxide is 50~80 mol % in alkylene oxide and an average molecular weight is 3,000~8,000.

6. A flexible polyurethane foam according to claim 4 wherein the organic polyisocyanate of claim 1 has a content of the two benzene ring compound of from more than 60% by weight to 80% by weight and a ratio [three benzene ring compound]/[four or more benzene ring compound + less active ingredient] of 1.2~10.0, the ratio (a)/(b) is 95~85/5~15 by weight, and tile polyoxyalkylene polyol has an initiator functionality of 2~4, an ethylene oxide proportion of 50~80 mol % in alkylene oxide and an average molecular weight of 3,000~8,000.

7. A process for preparing a flexible polyurethane foam by reacting an organic polyisocyanate composition with a mixture of an active hydrogen containing compound, blowing agent, catalyst, surfactant and other auxiliary agent, comprising using water as a blowing agent and using a mixture of:

(a) polymethylenepolyphenyl isocyanate represented by the formula (1):

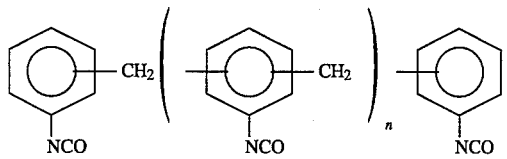 (1)

wherein n is 0 or an integer of 1 and more, content of a two benzene ring compound (n=0) is from more than 60% by weight to 90% by weight, and the weight ratio of the three benzene ring compound (n=1) to the sum of the four or more benzene ring compound (n>2) and the less active ingredient; [three benzene ring compound]/[four or more benzene ring compound + less active ingredient] is 1.1~20.0, and (b) tolylene diisocyanate, in ratio (a)/(b) of 97~80/3~20 by weight as the organic polyisocyanate composition.

8. A process for preparing a flexible polyurethane foam according to claim 7 wherein the weight ratio [three benzene ring compound]/[four or mole benzene ring compound+less active ingredient] is 1.2~10.0 and the content of the two benzene ring compound is from 60% by weight to 80% by weight.

9. A process for preparing a flexible polyurethane foam according to claim 7 wherein the ratio (a)/(b) is 95~85/5~15 by weight.

10. A process for preparing a flexible polyurethane foam comprising using as an organic polyisocyanate composition an isocyanate terminated prepolymer obtained by reacting the organic polyisocyanate composition of claim 7 with a single compound or a mixture of polyoxyalkylene polyol having an initiator functionality of 2~4, an ethylene oxide proportion of 0~85 mol % in alkylene oxide and an average molecular weight of 2,000~10,000.

11. A process for preparing a flexible polyurethane foam according to claim 10 wherein the proportion of the ethylene oxide is 50~80 mol % in the alkylene oxide and the average molecular weight is 3,000~8,000.

12. A process for preparing a flexible polyurethane foam according to claim 10 wherein the organic polyisocyanate composition of claim 7 has the content of the two benzene ring compound of from 60% by weight to 80% by weight, the ratio [three benzene ring compound]/[four or more benzene ring compound + less active ingredient] is 1.2~10.0, the ratio (a)/(b) is 85~85/5~15 by weight, and the polyoxyalkylene polyol has the initiator functionality of 2~4, the ethylene oxide proportion of 50~80 mol % in the alkylene oxide and the average molecular weight of 3,000~8,000.

* * * * *

UNITED STATES PATENT AND TRADEMARK OFFICE
CERTIFICATE OF CORRECTION

PATENT NO. : 5,478,866
DATED : December 26, 1995
INVENTOR(S) : Masashi OBATA, et al.

It is certified that error appears in the above-indentified patent and that said Letters Patent is hereby corrected as shown below:

IN THE ABSTRACT [57] on the face of the patent, line 11, delete "1.1-20.0" and insert therefore --1.1~20.0--.

Column 12:

Claim 4, line 45, delete space between "~ 10,000".

Claim 5, lines 48 and 49, move "8,000" to next line.

Claim 7, line 16, delete "(n > 2)" and insert therefor --(n ≥ 2)--.
Column 14:
Claim 12, line 22, delete "85~85" and insert therefor --95~85--.

Signed and Sealed this

Sixteenth Day of July, 1996

Attest:

BRUCE LEHMAN

*Attesting Officer*     *Commissioner of Patents and Trademarks*